(12) United States Patent
Narita (10) Patent No.: US 8,548,233 B2
(45) Date of Patent: Oct. 1, 2013

(54) IMAGE PROCESSING APPARATUS AND COMPRESSION METHOD THEREFOR

(75) Inventor: Tateki Narita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 294 days.

(21) Appl. No.: 13/162,491

(22) Filed: Jun. 16, 2011

(65) Prior Publication Data

US 2012/0008861 A1    Jan. 12, 2012

(30) Foreign Application Priority Data

Jul. 7, 2010 (JP) .................................. 2010-155254

(51) Int. Cl.
*G06K 9/36* (2006.01)

(52) U.S. Cl.
USPC .......................................................... 382/166

(58) Field of Classification Search
USPC ................ 382/162–167, 232–251, 298–299; 358/1.2, 1.9, 518–521, 539, 451, 528, 426.01–426.16
See application file for complete search history.

(56) References Cited

U.S. PATENT DOCUMENTS

| | | | | |
|---|---|---|---|---|
| 5,901,254 A * | 5/1999 | Iguchi et al. | ................... | 382/298 |
| 6,285,458 B1 * | 9/2001 | Yada | ............ | 358/1.15 |
| 7,912,300 B2 * | 3/2011 | Matsumoto | ................... | 382/232 |
| 8,098,942 B2 * | 1/2012 | Johnston | ....................... | 382/232 |
| 8,331,705 B2 * | 12/2012 | Shiraishi et al. | ............... | 382/238 |
| 8,369,615 B2 * | 2/2013 | Misawa | ......................... | 382/162 |
| 8,401,287 B2 * | 3/2013 | Tsujii | ............................. | 382/166 |
| 8,452,083 B2 * | 5/2013 | Kambegawa | ................... | 382/162 |
| 2008/0069457 A1 | 3/2008 | Matsumoto | ..................... | 382/232 |
| 2008/0310758 A1 | 12/2008 | Kashibuchi | .................... | 382/293 |
| 2010/0098333 A1 * | 4/2010 | Aoyagi | ........................... | 382/166 |
| 2011/0158525 A1 | 6/2011 | Narita | ............................ | 382/166 |
| 2011/0317232 A1 * | 12/2011 | Aoyagi | .......................... | 358/518 |
| 2011/0317913 A1 * | 12/2011 | Shibuya | ......................... | 382/166 |
| 2012/0014597 A1 * | 1/2012 | Matsunaga | ..................... | 382/166 |
| 2012/0321182 A1 * | 12/2012 | Yamamoto | ..................... | 382/166 |

FOREIGN PATENT DOCUMENTS

| | | |
|---|---|---|
| JP | 2008-042687 | 2/2008 |
| JP | 2008-238590 | 10/2008 |

* cited by examiner

*Primary Examiner* — Ishrat I Sherali
(74) *Attorney, Agent, or Firm* — Fitzpatrick, Cella, Harper & Scinto (57) ABSTRACT

An input image is divided into a plurality of predetermined sized image pieces, and code data indicating an arrangement pattern of color data included in each image piece and color data for the number of colors included in each image piece are output as first output data. When the first output data has a size greater than or equal to a predetermined data size, according to the number of image pieces by counted number of colors and priority of a pattern for color reduction, a pattern for color reduction relating the plurality of image pieces is determined. Among the divided image pieces, color-reduction processing is performed on an image piece corresponding to the determined pattern. Then, code data indicating an arrangement pattern of color data included in each image piece and code data for the number of colors included in each image piece are output as second output data.

7 Claims, 9 Drawing Sheets

| 801 NUMBER OF REDUCED COLORS IN IMAGE PIECE | 802 CHANGE OF NUMBER OF COLORS IN IMAGE PIECE | 803 PRIORITY IN GROUP |
|---|---|---|
| 804 ~ 1 (Gr.1) | • 4→3<br>• 3→2<br>• 4→3, 3→2<br>• 2→1<br>• 4→3, 2→1<br>• 3→2, 2→1<br>• 4→3, 3→2, 2→1 | 1<br>2<br>3<br>4<br>5<br>6<br>7 |
| 805 ~ 2 (Gr.2) | • 4→2<br>• 4→2 + (Gr.1)<br>• 3→1<br>• 3→1 + (Gr.1)<br>• 4→2, 3→1<br>• 4→2, 3→1 + (Gr.1) | 1<br>2.1~<br>3<br>4.1~<br>5<br>6.1~ |
| 806 ~ 3 (Gr.3) | • 4→1<br>• 4→1 + (Gr.2) | 1<br>2.1~ |

CALCULATE REDUCED DATA SIZE FROM CODE DATA COUNTER VALUE AND SELECT APPROPRIATE PATTERN

WHEN DATA SIZE IS OVER PREDETERMINED MEMORY SIZE, INCREASE NUMBER OF REDUCED COLORS IN PIECE

FIG. 9

IMAGE PROCESSING APPARATUS AND COMPRESSION METHOD THEREFOR

BACKGROUND OF THE INVENTION

1. Field of the Invention

The present invention relates to a technique of compressing data size of image data input into an image processing apparatus and storing compressed image data for reduction of memory resource and high speed processing.

2. Description of the Related Art

In an image processing apparatus, it is necessary to handle high resolution image data for improvement in image quality and image processing function. For this purpose, an image compression method to efficiently hold high resolution image is required.

As a conventional image compression method, a method of dividing an image into predetermined sized regions and selecting compression processing in region units is known (e.g. see Japanese Patent Laid-Open No. 2008-42687). According to this method, a high compression ratio can be achieved by encoding an image resolution-converted with a resolution converter in compression processing.

Further, a method of pseudo high-resolution conversion processing to restore an original image is known (e.g. see Japanese Patent Laid-Open No. 2008-238590). According to this method, it is possible to restore a high resolution image while reduce the data size by resolution conversion by adding attribute data (pixel pattern or the like) corresponding to each pixel to a converted low-resolution image.

In an image processing apparatus, the memory resource to store image data is limited, and especially when high resolution image data is handled, since the size of the image data is large, it is necessary to save the memory resource. Accordingly, it is necessary to control the size of image data after conversion to a predetermined or smaller data size.

In this pseudo high-resolution conversion processing, regarding an image having a pattern where the pixel values of peripheral pixels are complicated, the amount of attribute data tends to be large. In some cases, the size of resolution-converted image data is larger than that of original image data. In such case, it is possible to perform re-conversion processing by performing color-reduction processing on the original image to equalize pixel values of peripheral pixels thus reduce the attribute data.

However, in the conventional re-conversion processing, since the color-reduction processing is sequentially performed by each rectangular region, the size of image data is determined after the conversion. Accordingly, in only one color-reduction processing, an optimum size of the image data cannot be obtained, and problems of reduction of processing speed and degradation of image quality as follows occur.

First, when the degree of color-reduction processing (hereinbelow, referred to as a "color-reduction processing level") is low, the size of the image data cannot be sufficiently reduced, and it is necessary to change the color-reduction processing level and perform the re-conversion processing again.

Second, when the color-reduction processing level is high, the size of compressed image data is unnecessarily reduced and image quality is degraded. As a result, it is necessary to repeat the color-reduction processing and pseudo high-resolution conversion processing to obtain an optimum image data size. This reduces the entire processing speed.

SUMMARY OF THE INVENTION

The present invention provides an image processing apparatus and a compression method for the apparatus to mitigate reduction of processing speed and degradation of image quality upon compression of data size of an input image.

According to an aspect of the present invention, provided is an image processing apparatus comprising: a division unit to divide an input image into a plurality of predetermined sized image pieces; a first output unit to determine code data indicating an arrangement pattern of color data included in each divided image piece and color data for the number of colors included in each divided image piece by comparing color data of respective pixels in the image piece, and to output the determined code data and the color data as first output data; a count unit to obtain the number of colors in each divided image piece and count the number of image pieces by the number of colors; a determination unit to, when the first output data output from the first output unit has a data size greater than or equal to a predetermined data size, determine a pattern for color reduction with respect to the plurality of image pieces in accordance with the number of image pieces by the counted number of colors and a priority of the pattern for color reduction; and a second output unit to perform color-reduction processing on an image piece corresponding to the pattern determined by the determination unit among the divided image pieces, then determine code data indicating an arrangement pattern of color data included in each image piece and color data for the number of colors included in the image piece by comparing color data of respective pixels in the image piece, and output the determined code data and the color data as second output data.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Hereinbelow, preferred embodiments of the present invention will now be described in detail in accordance with the accompanying drawings. In the following embodiments, an input image is converted to data having low-resolution image data, code data and interpolation data. In the present embodiment, this conversion processing will be referred to as "resolution compression". Note that the low-resolution image data has a pixel value of a representative pixel (a pixel in a predetermined position (e.g. lower right pixel) in a rectangular region) when an original image is divided by an image region in previously-defined size (2×2 pixel rectangular region) as a unit. Further, the code data is data of code indicating an arrangement pattern of pixel values in the image region. Further, the interpolation data is data indicating a pixel value other then the representative pixel in the image region. Note that the positions of pixel values having the same pixel value (the positions where the same color exists) in the image region can be determined by comparing the respective pixel values in the image region (2×2 pixel rectangular region). Then, based on the result of determination, code data indicating an arrangement pattern indicating the positions of the respective pixel values in the image region is used.

Figure 1:
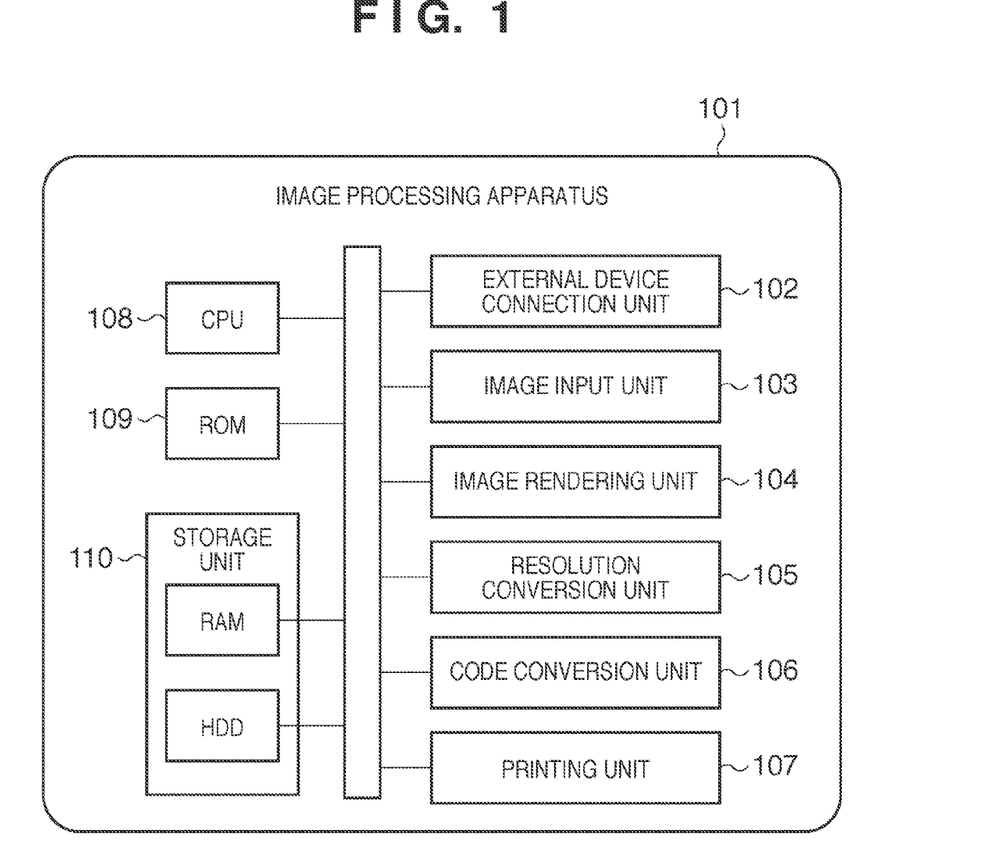
FIG. 1 is a block diagram showing a hardware configuration of an image processing apparatus according to an embodiment of the present invention.

First, a hardware configuration of an image processing apparatus in the present embodiment will be described with reference to the block diagram of FIG. 1. As shown in FIG. 1, an image processing apparatus 101 has an external device connection unit 102, an image input unit 103, an image mapping unit 104, a resolution conversion unit 105, a code conversion unit 106, a printing unit 107, a CPU 108, a ROM 109 and a storage unit 110.

The external device connection unit 102 performs data transmission/reception with respect to an external device via a LAN or USB connection. The image input unit 103 inputs image data received via the external device connection unit 102. Image data, including vector data, may be data having objects in various resolutions.

The image mapping unit 104 maps data having objects in various resolutions, including vector data, to a bitmap image. The resolution conversion unit 105 performs resolution compression or decompression in a predetermined resolution on the bitmap image mapped with the image mapping unit 104. Note that in the resolution compression, the pattern of color information (pixel value) is analyzed by predetermined compressed rectangular region, and low-resolution image data, code data and interpolation data are generated.

The code conversion unit 106 performs code compression or decompression in a predetermined image format such as JPEG format on the image generated with the resolution conversion unit 105. The printing unit 107, including an electrophotographic type or ink-jet type engine, print-outputs the generated and image-processed image data.

The CPU 108, together with the ROM 109, the storage unit 110 and a peripheral device (not shown), functions as a controller of the image processing apparatus 101, to control the entire apparatus. The ROM 109 is a memory holding a control program for the CPU 108 and control data. The storage unit 110 is a memory for storage of variables of the control program for the CPU 108 and respective processing buffers in the image processing apparatus 101, and has a storage medium such as a RAM or an HDD.

Figure 2:
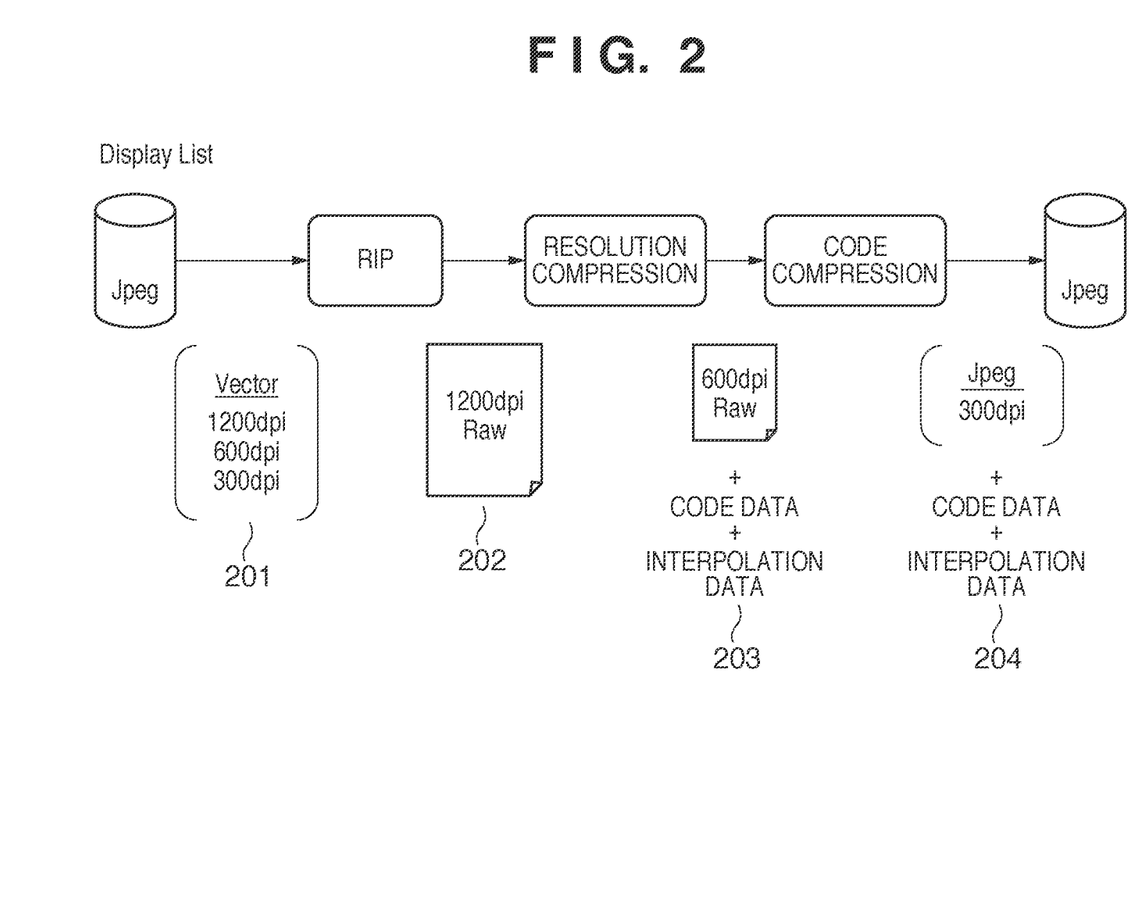
FIG. 2 is an explanatory view of processing in a resolution conversion unit and a code conversion unit shown in FIG. 1.

Next, image processing in a printing function upon reception of an instruction to print-output image data from an external device will be described with reference to FIG. 2. Image data input with the image input unit 103 indicates an image including vector information, and is stored as a Display List 201 in the storage unit 109. Next, the image data is RIP-processed with the image mapping unit 104, and mapped to a bitmap image 202 in a print resolution (e.g. 1200 dpi). Next, the mapped bitmap image 202 is resolution-compressed with the resolution conversion unit 105 to for example 600 dpi compressed resolution image data (+code data+interpolation data) 203.

Then, the image data (+code data+interpolation data) 203 is further code-compressed with the code conversion unit 106 (by for example JPEG compression) to code compressed image (+code data+interpolation data) 204, and is stored into the storage unit 109. The image data compressed and stored in this manner is subjected to code decompression and resolution decompression in a reverse manner upon printing, and is print-output with the printing unit 107.

Figure 3:
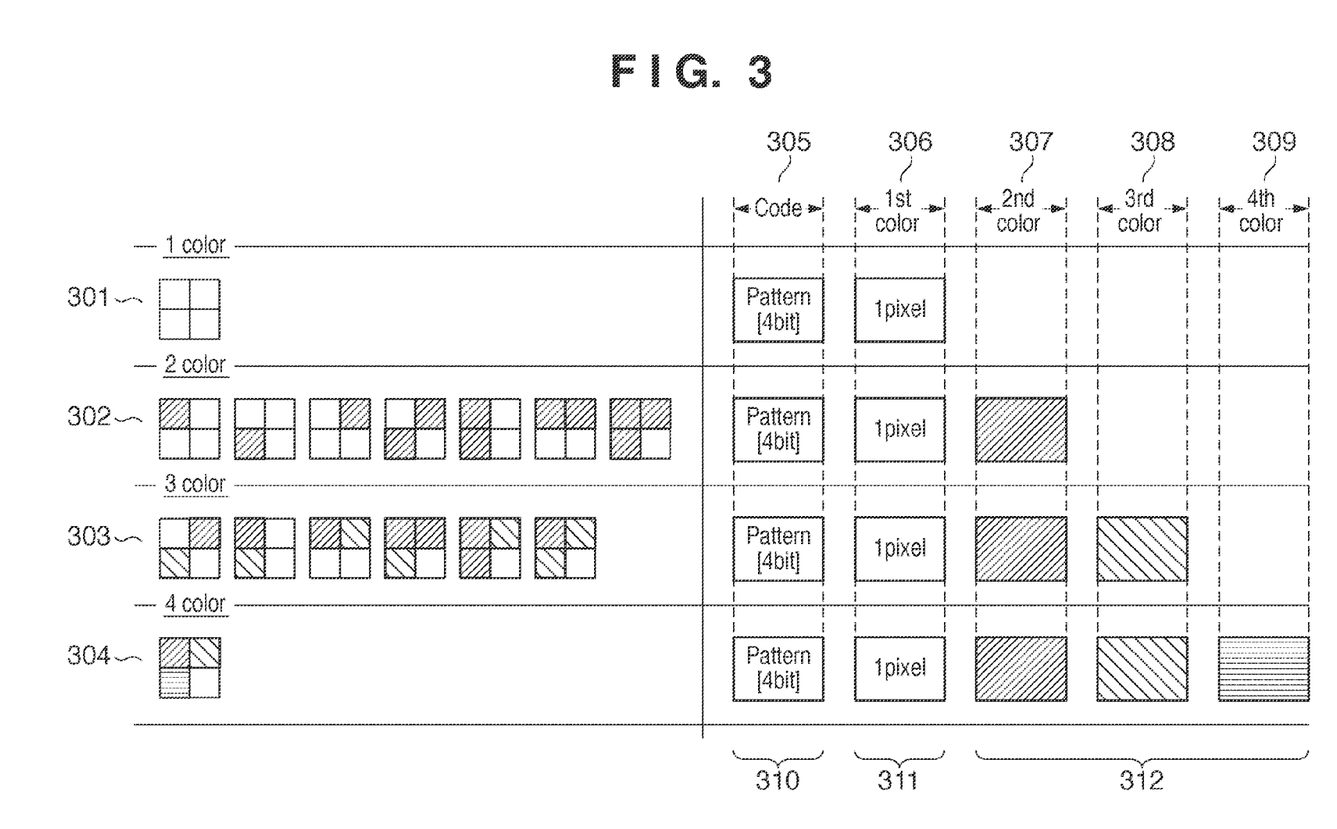
FIG. 3 is an explanatory view of an example of a data format.

Next, an example of the data format in the above-described resolution compression processing will be described with reference to FIG. 3. FIG. 3 shows an example of the data format after the resolution compression converted to the image data (+code data+interpolation data) 203. In this example, when an input image (bitmap image 202) is divided by 2×2 pixel sized rectangular region and compressed by each rectangular region (hereinbelow referred to as an "image piece") as a compression unit, a data format by the number of colors existing in each image piece is shown.

As shown in FIG. 3, the data format has code data 310, image data 311 indicating the pixel of a representative color (pixel value of a pixel in a predetermined position (representative pixel)), and interpolation data 312 indicating a color other than the representative color (pixel value other than the representative color). The code data 310 indicates a color arrangement pattern of an image piece, and is represented as a Code 305 bit string. Further, it is possible to determine the number of colors in the image piece from the code data 310. Note that as the image piece has 2×2 pixels, as long as 15 patterns can be represented as a color arrangement pattern, a 4-bit bit string may be used as the Code 305.

The image data 311 is a representative pixel selected from a predetermined position (lower right pixel here) in the 2×2 pixel image piece and is represented as a pixel value of a first color 305. That is, the image data 311 is low resolution image data (indicating an image in a ½ resolution in comparison with the image before resolution compression). The interpolation data 312 indicates a pixel value of a pixel other than the representative pixel in the image piece and is represented as each pixel value in correspondence with the number of colors existing in the image piece.

In FIG. 3, an image piece 301 indicates a data structure as one color. In this case, since other pixel value than that of the representative color does not exit, there is no interpolation data in the image piece 301. Next, an image piece 302 indicates an arrangement pattern when the image piece has two colors, and 7 color arrangement patterns exist. As interpolation data of the image piece 302, only second color data 307 is included.

Next, an image piece 303 indicates an arrangement pattern when the image piece has three colors, and six color arrangement patterns exist. As interpolation data of the image piece 303, the second color data 307 and third color data 308 are included. Next, an image piece 304 indicates an arrangement pattern when the image piece has four colors, and only one color arrangement pattern exists. As interpolation data of the image piece 304, the second color data 307, the third color data 308 and fourth data 309 are included.

In this manner, in the entire image, as the number of colors in each image piece is smaller, the data size is smaller, and the compression ratio in the resolution compression processing is higher. Further, in the entire image, when the number of colors in each image piece is large the data size is larger, and the compression ratio in the resolution compression processing is lowered.

Figure 4:
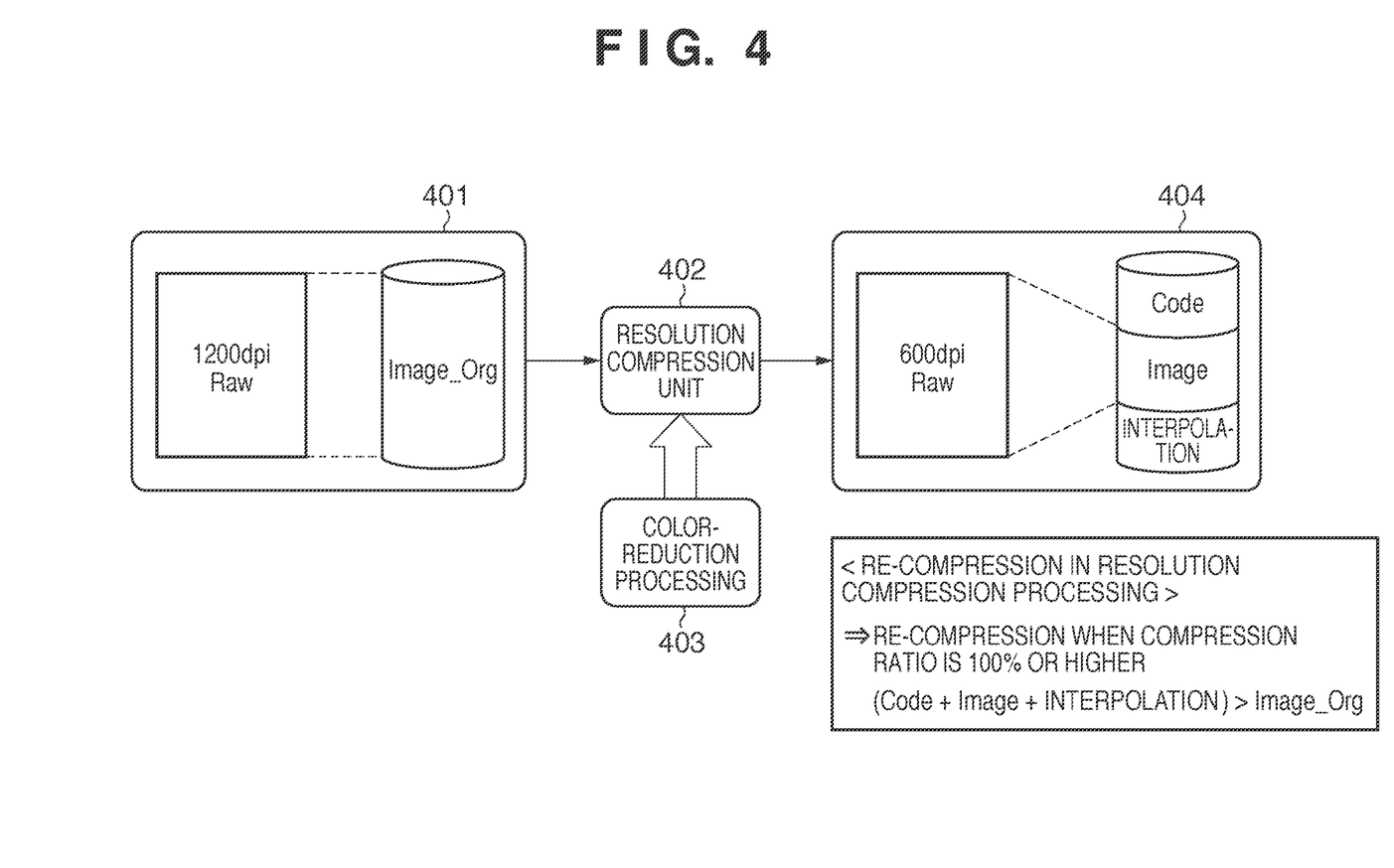
FIG. 4 is an explanatory view of an outline of re-compression processing in the embodiment.

Next, the outline of re-compression processing performed in the resolution compression processing when the data size after compression is greater than or equal to a predetermined data size will be described with reference to FIG. 4. In FIG. 4, input data 401 indicates an input image in a resolution compression unit 402 which is for example a 1200 dpi image. The resolution compression unit 402 is a module to perform the resolution compression processing which converts the input image to an image in for example the data format shown in FIG. 3. Output data 404 indicates an output image from the resolution compression unit 402, which has a 600 dpi image in for example the data format shown in FIG. 3, code data and interpolation data.

As described above, when the number of colors in each image piece is large, the data size of the output data 404 is increased. Further, as the code data 310 is added, the data size may be larger than that of the input data 401. In this case, the resolution compression unit 402 performs color-reduction processing 403 on the input data 401 thus performs re-compression.

The color-reduction processing 403 is processing to reduce the number of colors in each image piece in the input data 401. For example, plural pixels having similar pixel values in the image piece are selected, then the pixel values are averaged to convert the colors to the same color. With the color-reduction processing 403, the interpolation data 312 is reduced in each image piece, and the compression ratio in the re-compression processing can be increased.

Figure 5:
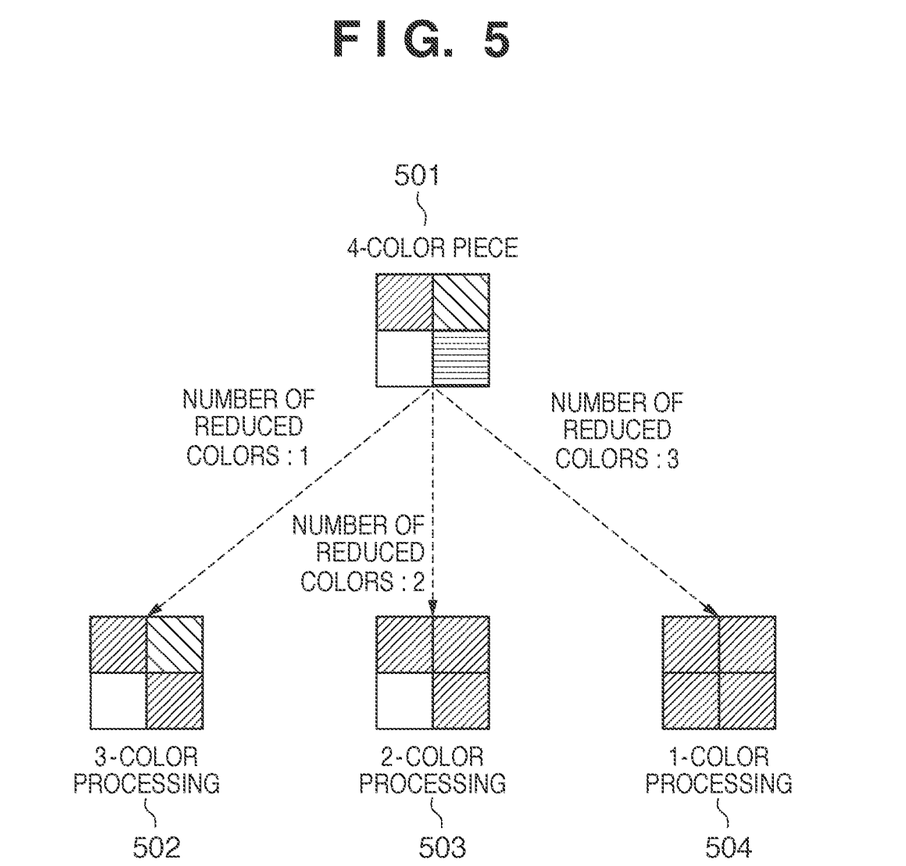
FIG. 5 is an explanatory view of a color-reduction processing level in resolution compression processing.

FIG. 5 shows color-reduction processing levels in the resolution compression processing. In the above-described color-reduction processing 403, the intensity of color reduction (hereinbelow, referred to as a "color-reduction processing level") is changed in accordance with the number of reduced colors. For example, assuming that an image piece before the resolution compression has four colors as in the case of an image piece 501, when the number of colors is changed to three colors as in the case of an image piece 502 by averaging the pixel values of two pixels among the four pixels, the number of reduced colors is one, and the color-reduction processing level is 1. Further, when the number of colors is changed to two colors as in the case of an image piece 503 by averaging the pixel values of three pixels among the four pixels, the number of reduced colors is two, and the color-reduction processing level is 2. Further, when the number of colors is changed to one color as in the case of an image piece 504 by averaging the pixel values of all the four pixels, the number of reduced colors is three, and the color-reduction processing level is 3.

Further, in the color-reduction processing 403, it is also possible to change the intensity of color reduction by providing a predetermined threshold value upon selection of plural pixels having similar pixel values. In the following description, the color-reduction processing level is defined with the number of reduced colors, however, it may be arranged such that the color reduction level is defined with plural parameters including the above-described threshold value.

Figure 6:
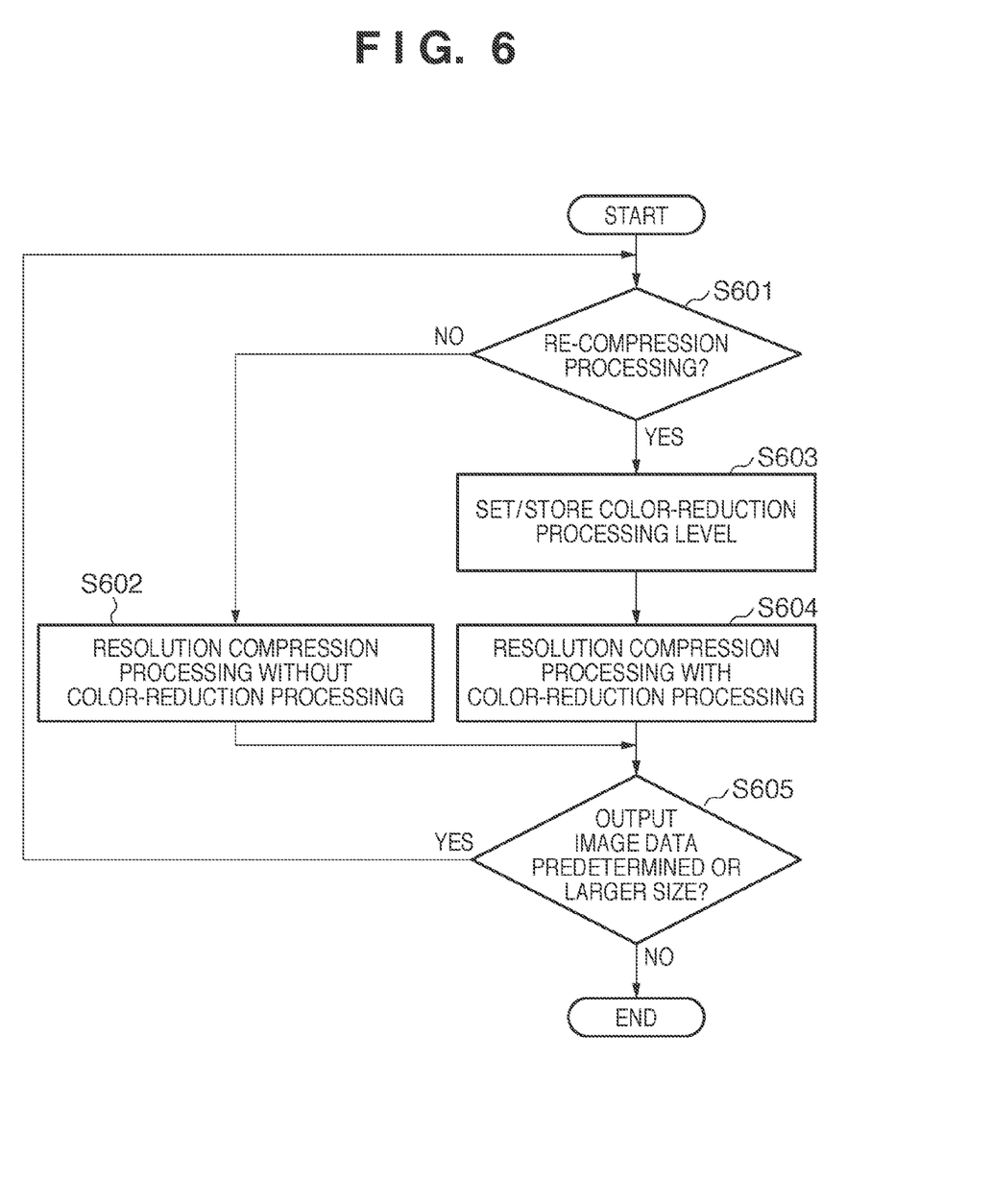
FIG. 6 is a flowchart showing the re-compression processing in the resolution compression processing.

FIG. 6 is a flowchart showing re-compression processing in the resolution compression processing. First, at step S601, it is determined whether or not the re-compression processing can be performed. Note that the determination is performed in accordance with whether or not the color-reduction processing level is set. When it is the first time to perform the compression processing, the process proceeds to step S602, at which the resolution compression processing is performed without color-reduction processing.

In the resolution compression processing, image data is divided by a predetermined size (2×2 pixel size) block (i.e. image piece), and color data (pixel values) of respective pixels in the image piece are compared with each other. Then information (code data) indicating an arrangement pattern of color data included in the image piece and color data information (pixel value information) for the number of colors included in the image piece are determined. Then, the determined code data indicating the arrangement pattern and the color data information for the number of colors are output. That is, in each image piece, the number of colors in the image piece and the arrangement of the respective colors can be found by comparing color data of the respective pixels each other. Accordingly, it is possible to determine the arrangement pattern of the color data included in the image piece and the color data information for the number of colors based on the result of comparison. In the output color data information, first color data information corresponding to a pixel in a predetermined position in each image piece (e.g. color data information regarding the lower right pixel in each image piece) and other color data information (second to fourth color data information) are separately stored in memory regions. That is, the arrangement pattern information obtained from each image piece, first color data information and other color data information are stored at once in respectively different memory regions. In each image piece, pixels in the same color often exist, the data stored in the memory region often is compressed data having a data size smaller than that of the original image data. Further, as the first color data information indicates a pixel value of a pixel in a predetermined position in each image piece, the first color data information stored in a continuous memory region is equal to a low resolution image which is generated by simple thinning of an initial image. Accordingly, it is possible to easily extract low resolution image data from resolution-compressed data. Further, as low resolution image data having the first color data information in each image piece is stored in the continuous memory region, it is possible to facilitate processing using coded data and perform pixel processing with respect to a low resolution image without decoding.

Regarding the data output in the processing at step S602 (code data, the first color data information (low resolution image) and the second to fourth color data information (interpolation data)), it is determined at step S605 whether or not the size of the output data is greater than or equal to a predetermined data size. When it is determined as a result of determination that the size of the output data is greater than or equal to the predetermined data size, the process returns to step S601, to perform the re-compression. Further, when it is determined that the size of output data is not greater than or equal to the predetermined size, the re-compression processing ends.

On the other hand, at the above-described step S601, when it is determined that it is the re-compression processing, the process proceeds to step S603, at which the color-reduction processing level is set and stored. Note that when it is the second or subsequent re-compression processing, the previous color-reduction processing level is referred to, and a greater value is set. Then at step S604, in accordance with the color-reduction processing level set at step S603, the color-reduction processing is performed on the input data, and the resolution compression processing as in the case of step S602 is performed on the color-reduced image data. At the next step S605, as described above, it is determined whether or not the output data size is greater than or equal to a predetermined data size. When it is determined that the output data size is greater than or equal to the predetermined data size, the process returns to step S601 to further perform the re-compression, otherwise, the processing ends.

That is, when the color-reduction processing level set at step S603 is not an appropriate value, the output data size is not smaller than the predetermined data size.

Accordingly, even though the color-reduction processing is performed to perform the re-compression, when the output data size is not sufficiently small and the re-compression is required again, the performance is significantly degraded.

Further, in a case where the color-reduction processing is performed excessively, even when the output data size is small, the image quality may be excessively degraded.

In the present embodiment, in the setting of the color-reduction processing level at step S603, a control method for previously determining an output data size and setting the color-reduction processing level to an appropriate value in correspondence with input data is provided. Accordingly, the output data size at step S604 is less than or equal to the size of input data, and the re-compression processing is performed only once. Further, the output data size is not excessively small, and the degradation of image quality can be prevented.

Figure 7:
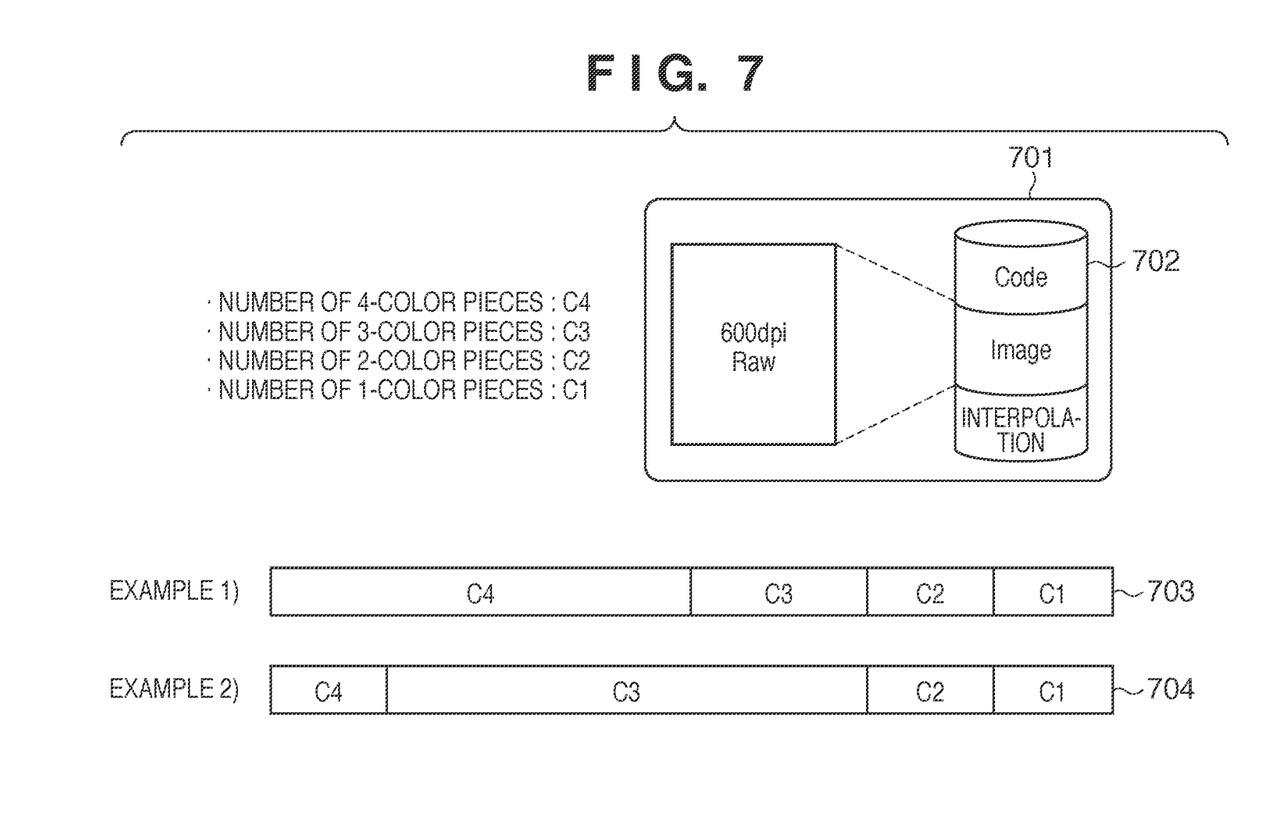
FIG. 7 is an explanatory view of an example of count values of code data in the resolution compression processing.

Next, a counter for the code data in the resolution compression processing will be described with reference to FIG. 7. In FIG. 7, code 702 as resolution compression output data 701 corresponds to the code data 310 in the data format shown in FIG. 3.

In the present embodiment, code 702 that is the code data 310 is used for setting of the color-reduction processing level. Since the code data 310 indicates a color arrangement pattern in an image piece in which the number of colors in the image piece can be specified. Accordingly, with respect to the entire input data, it is possible to count the number of image pieces by the number of colors. This is referred to as a "code data counter". Further, the code data counter counts in the initial resolution compression processing at the above-described step S602.

Note that assuming that the number of 4-color image pieces is C4, the number of 3-color image pieces is C3, the number of 2-color image pieces is C2, the number of 1-color image pieces is C1, when C4>C3>C2>C1 holds as the relation of the code data counter 703 with respect to the input image data in Example 1), it is understood that the proportion of the 4-color image pieces is high. Further, when C3>C4>C2>C1 holds as the relation of the code data counter 704 with respect to the input image data in Example 2), it is understood that the proportion of the 3-color image pieces is high.

In this manner, it is possible to detect the number of image pieces by the number of colors by counting the code data. Accordingly, it is possible to calculate the output data size after the resolution compression at the set color-reduction processing level, and further, it is possible to variously control the output data size by setting the color-reduction processing level by the number of colors.

Next, a method for determination of the color-reduction processing level to determine the color-reduction processing level in the resolution compression processing will be described with reference to FIG. 8. In the example shown in FIG. 8, the following three factors are provided so as to determine the color-reduction processing level. That is, a number of color-reductions in image piece 801, a change of number of colors in image piece 802, an intra-group priority 803.

First, the number of color-reductions in image piece 801 is a maximum number of reduced colors allowed in the color-reduction processing with respect to the image piece, and accordingly, there are three groups, a group 804 (Gr. 1) of the maximum reduced colors 1, a group 805 (Gr. 2) of the maximum reduced colors 2, and a group 806 (Gr. 3) of the maximum reduced colors 3. As the number of maximum reduced colors is smaller, the degradation of image quality is reduced, accordingly, the color-reduction processing level is determined from a group of a small number of maximum reduced colors with the highest priority.

Next, the change of number of colors in image piece 802 is a pattern of change of the number of colors (reduced color pattern) with respect to the number of reduced colors in image piece 801, and is represented as a combination of the numbers of colors. For example, there are seven patterns for the group 804 (Gr. 1).

4-color image piece is changed to 3-color image piece
3-color image piece is changed to 2-color image piece
4-color image piece is changed to 3-color image piece+3-color image piece is changed to 2-color image piece
2-color image piece is changed to 1-color piece
4-color image piece is changed to 3-color piece+2-color image piece is changed to 1-color piece
3-color image piece is changed to 2-color piece+2-color image piece is changed to 1-color piece
4-color image piece is changed to 3-color image piece+3-color image piece is changed to 2-color image piece+2-color image piece is changed to 1-color image piece Accordingly, it is possible to calculate the output data size in each color change pattern after the color-reduction processing from the code data counter shown in FIG. 7 and the data format shown in FIG. 3.

For example, in the pattern corresponding to the group 804 (Gr. 1), when the pattern to change a 4-color image piece to a 3-color image piece is determined as the color-reduction processing level, the processing is performed as follows. Assuming that the pixel value of one pixel is represented with three bytes, the data size compressed with the color-reduction processing is calculated as 3 bytes×1 (the number of reduced colors per piece)×C4 (the number of 4-color image pieces).

Next, the intra-group priority 803 indicates a priority with respect to the change of number of colors in image piece 802. As the degradation of image quality by the color-reduction processing is low, a high priority is set. Further, it can be considered that as the number of colors in an image piece before the color reduction is large, the degradation of image quality is low.

Accordingly, in the priority with respect to the pattern of change of number of colors in the group 804 (Gr. 1), the pattern of 4-color image piece to 3-color image piece is in the highest priority rank, and the order is described as above. As the priority of the Gr. 1, since the number of color-changed pixels is smaller as the number of colors before the color reduction is larger, the order is described as above. For example, when a 4-color image piece is changed to a 3-color image piece, as two colors of two pixels in the image piece are color-reduced to one color, the colors of two pixels are changed. Further, when a 3-color image piece is changed to 2-color image piece, as two colors of two or three pixels in the image piece are color-reduced to one color, the colors of two or three pixels are changed. That is, as the priority order in a group having the number of reduced colors is the same, a combination of small number of color-changed pixels has the highest priority.

Further, in the group 805 (Gr. 2), the pattern to change the "4-color image piece to 2-color image piece" is ranked in the first place, and the pattern "combination of pattern to change the 4-color image piece to 2-color image piece and (priorities other than the 4-color image piece of Gr. 1)", the second place. The second place is further divided into small patterns by referring to the priority of the group Gr. 1 and combining the priorities other than the 4-color image piece (3-color image piece to 2-color image piece and 2-color image piece to 1-color image piece). That is, as the first pattern in the second place, the pattern "4-color image piece to 2-color image piece, and 3-color image piece to 2-color image piece" is selected, next, as the second pattern in the second place, the pattern "4-color image piece to 2-color image piece, and 2-color image piece to 1-color image piece" is selected. Further, as the third pattern in the second place, the pattern "4-color image piece to 2-color image piece, 3-color image piece to 2-color image piece, and 2-color image piece to 1-color image piece" is selected.

Figure 8:
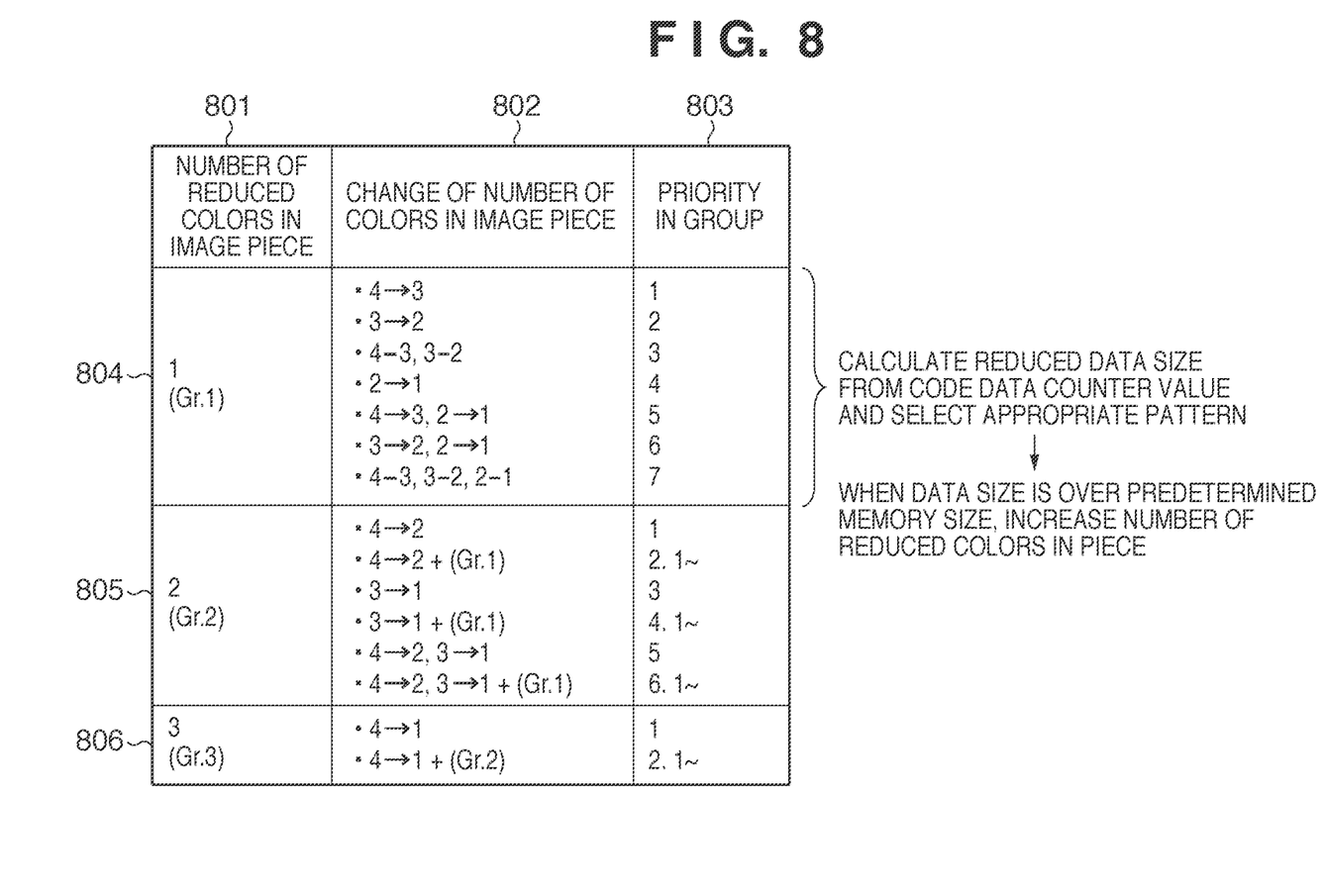
FIG. 8 is an explanatory view of a color-reduction processing level determination method in the resolution compression processing.

In the present embodiment, the output data size of each color change pattern is calculated in accordance with the three determination factors shown in FIG. 8. Further, it may be arranged such that a pattern in which the memory size is set to a predetermined target as a size for the output data size (e.g., a memory size allowable to the system or 70% of the input data size) or smaller and the degradation of image quality is at the minimum level, is determined as the color-reduction processing level.

Figure 9:
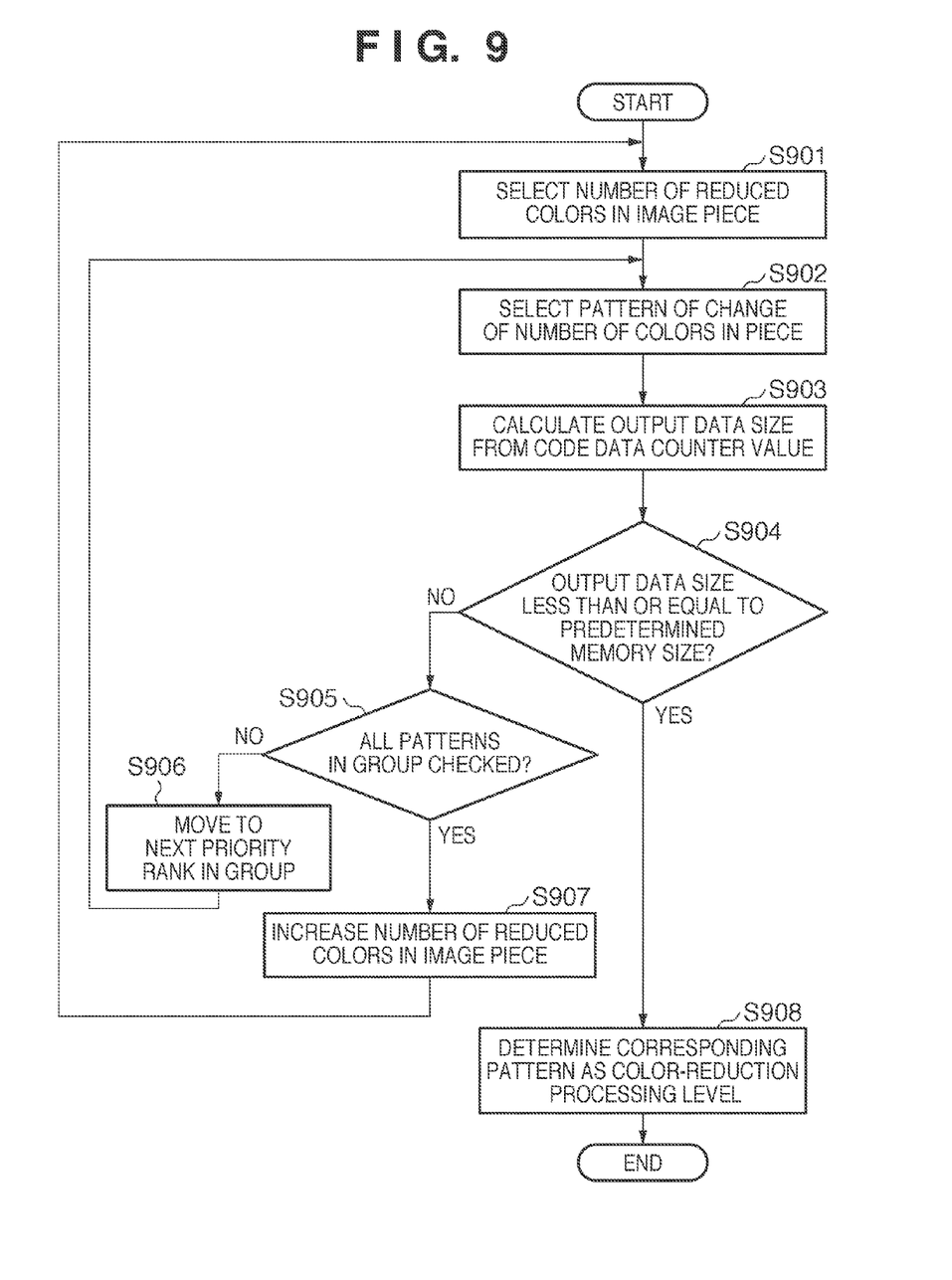
FIG. 9 is a flowchart showing the color-reduction processing level determination method.

Note that the method for determination of the color-reduction processing level according to the present embodiment will be described with reference to the flowchart of FIG. 9. At step S901, the number of reduced colors in image piece 801 is selected. In this example, the group 804 (Gr. 1) with the least number of reduced colors is selected first. Then at step S902, the change of number of colors in image piece 802 is selected. In this example, a pattern with the highest priority (a color reduction pattern indicating an image piece to be subjected to the color-reduction processing) is selected first in accordance with the intra-group priority 803. First, the pattern to color-reduce a 4-color image piece to a 3-color image piece is selected. Then at step S903, the output data size is calculated in accordance with the pattern selected at step S902.

In the present embodiment, the size of compressed data is calculated from the number of image pieces (C4, C3, C2 and C1) by the number of colors in the code data counter and the selected pattern of change of number of colors. Then, by reducing the calculated compressed data size from the first output data size before the color-reduction processing, the size of the second output data after the color-reduction processing is calculated.

Next, at step S904, it is determined whether or not the output data size calculated at step S903 is less than or equal to a predetermined memory size. Note that the predetermined memory size means a predetermined target data size (e.g., 70% of the input data size in the resolution compression processing), and the predetermined memory size is used as a reference of determination of necessity of re-compression. When it is determined as a result of determination that the output data size is less than or equal to the predetermined memory size, the process proceeds to step S908, at which the currently-selected pattern of change of number of colors is determined as the color-reduction processing level.

On the other hand, when it is determined at step S904 that the output data size is not less than or equal to the predetermined memory size, the process proceeds to step S905, at which it is checked whether or not all the patterns of change of number of colors have been selected in the group selected at step S901. When it is determined that all the patterns have not been selected, the process proceeds to step S906, at which the intra-group priority 803 is moved, then the process returns to step S902. Further, when it is determined that all the patterns have been selected, the process proceeds to step S907, at which the number of reduced colors in the image piece is incremented by one, then the process returns to step S901.

Note that even when the process returns from step S905 to step S901 or S902, the output size becomes less than or equal to the predetermined memory size by sequentially selecting a pattern of change of number of colors and calculating an output data size, and the process returns to step S908.

At step S908, the re-compression processing is performed using the pattern of change of number of colors determined as the pattern for color-reduction processing (color-reduction processing level). That is, with respect to the input image data, regarding an image piece having the number of colors corresponding to the pattern determined as the color-reduction processing level, corresponding color-reduction processing is performed and the re-compression processing is performed.

According to the present embodiment, upon execution of re-conversion processing in the resolution conversion, it is possible to infallibly avoid degradation of the performance in the re-conversion processing and at the same time to reduce the degradation of image quality by ensuring the output data size.

According to the present invention, it is possible to compress the input image data size while mitigate the reduction of processing speed and degradation of image quality.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-155254, filed Jul. 7, 2010, which is hereby incorporated by reference herein in its entirety.

What is claimed is:

1. An image processing apparatus comprising:
a division unit to divide an input image into a plurality of predetermined sized image pieces;
a first output unit to determine code data indicating an arrangement pattern of color data included in each divided image piece and color data for the number of colors included in each divided image piece by comparing color data of respective pixels in the image piece, and to output the determined code data and the color data as first output data;
a count unit to obtain the number of colors in each divided image piece and count the number of image pieces by the number of colors;
a determination unit to, when the first output data output from said first output unit has a data size greater than or equal to a predetermined data size, determine a pattern for color reduction with respect to said plurality of image pieces in accordance with the number of image pieces by said counted number of colors and a priority of the pattern for color reduction; and
a second output unit to perform color-reduction processing on an image piece corresponding to the pattern determined by said determination unit among said divided image pieces, then determine code data indicating an arrangement pattern of color data included in each image piece and color data for the number of colors included in the image piece by comparing color data of respective pixels in the image piece, and output the determined code data and the color data as second output data.

2. The apparatus according to claim 1, wherein in said count unit, said number of colors is specified based on the code data output from said first output unit.

3. The apparatus according to claim 1, wherein in said color-reduction processing, the number of colors in the image piece is reduced by averaging the plurality of pixels in said image piece.

4. The apparatus according to claim 1, wherein said priority is set sequentially from a pattern in which degradation of image quality is low.

5. The apparatus according to claim 1, wherein said determination unit obtains a data size of output data when the color-reduction processing of respective patterns are performed in the order of said priority based on the number of image pieces by said counted number of colors and said priority, and determines a pattern when the data size is smaller than said predetermined data size as said pattern for color reduction.

6. A compression method in an image processing apparatus for compression of a data size of an input image, comprising:

a division step of dividing the input image into a plurality of predetermined sized image pieces;

a first output step of determining code data indicating an arrangement pattern of color data included in each divided image piece and color data for the number of colors included in each divided image piece by comparing color data of respective pixels in the image piece, and outputting the determined code data and the color data as first output data;

a count step of obtaining the number of colors in each divided image piece and counting the number of image pieces by the number of colors;

a determination unit of, when the first output data output at said first output step has a data size greater than or equal to a predetermined data size, determining a pattern for color reduction with respect to said plurality of image pieces in accordance with the number of image pieces by said counted number of colors and a priority of the pattern for color reduction; and a second output step of performing color-reduction processing on an image piece corresponding to the pattern determined at said determination step among said divided image pieces, then determining code data indicating an arrangement pattern of color data included in each image piece and color data for the number of colors included in the image piece by comparing color data of respective pixels in the image piece, and outputting the determined code data and the color data as second output data.

7. A computer-readable recording medium holding a program for execution of the compression method for the image processing apparatus in claim 6 by a computer.

* * * * *